March 22, 1966 R. STEENECK 3,242,385

UNIVERSAL NETWORK ASSEMBLAGE

Filed April 13, 1964 3 Sheets-Sheet 1

*INVENTOR.*
R. STEENECK

*BY* Eli Weiss

ATTORNEY

March 22, 1966 R. STEENECK 3,242,385

UNIVERSAL NETWORK ASSEMBLAGE

Filed April 13, 1964 3 Sheets-Sheet 2

INVENTOR.
R. STEENECK

BY Eli Weiss

ATTORNEY

March 22, 1966 R. STEENECK 3,242,385

UNIVERSAL NETWORK ASSEMBLAGE

Filed April 13, 1964 3 Sheets-Sheet 3

INVENTOR.
R. STEENECK

BY Eli Weiss

ATTORNEY

United States Patent Office 3,242,385

Patented Mar. 22, 1966

3,242,385

UNIVERSAL NETWORK ASSEMBLAGE

Robert Steeneck, New York, N.Y., assignor to The Western Union Telegraph Company, New York, N.Y., a corporation of New York Filed Apr. 13, 1964, Ser. No. 361,605
2 Claims. (Cl. 317—101)

This application is a continuation-in-part of application 70,826, filed November 21, 1960, now abandoned.

This invention relates generally to an electrical network assemblage and more particularly to a network assemblage which can be readily adapted to provide a determinable group of electrical arrangements.

It is an object of this invention to provide a network assemblage which can assume a desired one of a determinable group of circuit arrangements.

It is also an object of this invention to provide a network assemblage which can be replaced readily with another assemblage.

It is another object of this invention to provide a network assemblage which is economical to build and reliable in operation.

Other objects and many of the attendant advantages of this invention will be readily appreciated as the apparatus becomes better understood by reference to the following detailed description when considered in connection with the accompanying drawings wherein:

FIGS. 1A, 1B, and 1C illustrate an exploded view of structure in accordance with the principles of this invention;

Similar reference characters refer to similar parts throughout the several views of the drawings.

Briefly, the contacts of a first plurality of contacts are coupled through desired electrical components such as capacitors, resistors, transistors, crystal diodes, and the like to the contacts of a second plurality of contacts—the first and second plurality of contacts functioning as end terminals for the components. A third plurality of contacts interconnected to provide discrete electrical conductive paths is coupled to the second plurality of contacts to couple electrically said contacts of the second plurality of contacts together according to a desired arrangement. The first set of contacts is coupled to a fourth set of contacts which provide the input circuit, the output circuit and, if required, the potential supply circuit for the arrangement or network of electrical components.

Figure 1A:
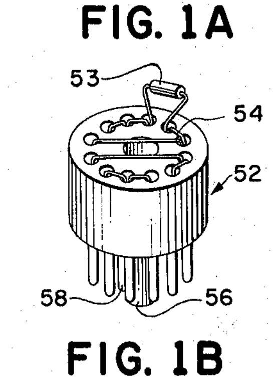
Figure 1B:
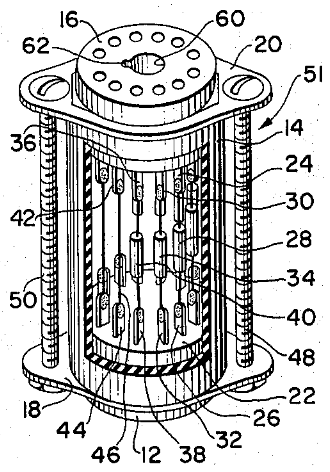
Figure 1C:
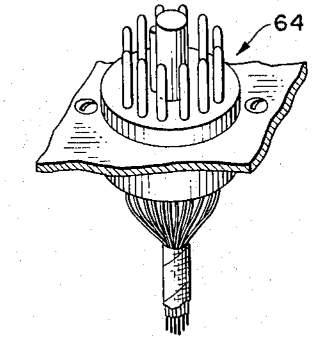

With reference to FIGS. 1A, 1B, and 1C, there is illustrated an exploded view of structure in accordance with the principles of this invention. In FIG. 1B, a first plurality of contacts illustrated here as a twelve prong vacuum tube socket 12 or the like is slidably supported by the lower end of a tube 14 composed of insulative material such as hard rubber, plastic, treated fabric, or the like. A second plurality of contacts illustrated here as a twelve prong vacuum tube socket 16 or the like is slidably supported by the upper end of the tube 14.

The socket 12 supports a mounting flange 18, and the socket 16 supports a mounting flange 20. These flanges define the depth to which the sockets can slide into the tube 14. In assemblage, the sockets 12, 16 are inserted into the ends of the tube 14 and rotated relative to each other until they are aligned as desired. A cutout 22 positioned within the wall of the tube 14 provides access to the contact connecting extensions of each socket. Now, working through the cutout 22, contact connecting extension 24 is coupled to contact connecting extension 26 through an electrical component 28; extension 30 is coupled to extension 32 through an electrical component 34; extension 36 is coupled to extension 38 through an electrical component 40; and extension 42 is coupled to extension 44 through a conductor such as a wire 46. To now obtain access to additional contact connecting extensions the two sockets 12, 16 are rotated slightly relative to the tube 14 until the desired unconnected contact connecting extensions appear opposite the cutout 22, and other desired electrical components or conductors are connected to the exposed extensions.

The electrical components which can be resistors, capacitors, crystal diodes, transistors, inductors, conductors, and the like function as means which define electrical conductive paths from one or more contacts of socket 12 to one or more contacts of socket 16.

After all of the desired connections are made the two sockets 12, 16 are locked to the tube 14 by means of two locking bolts 48, 50, each of which passes through clearance cutouts in the mounting plates 18, 20 and secured in position by nuts. The two bolts squeeze the sockets against the ends of the tube 14 to provide a very rigid electrical component unit 51. Now, the cutout in the tube functions as a window to permit the electrical components within the tube to be checked visually for obvious defects which may occur; to permit rapid identification of each of the components when testing for obscure electrical defects, and to permit the replacement of defective components without requiring the destruction of the complete device.

Obviously, if a component that is to be replaced is not positioned directly opposite the cutout—the user or service man merely loosens the two locking bolts 48, 50, rotates the tube 14 relative to the two sockets 12, 16 until the cutout appears opposite the desired component; and the required replacement is then made.

The unit illustrated in FIG. 1B is a particular combination of components and conducting wires. To now provide or define desired electrical paths between these components, an electric control means (FIG. 1A) is provided.

Now, with reference to FIG. 1A, the plurality of contacts such as are found on a twelve prong male plug 52 commonly used in combination with a vacuum tube (the mate to socket 16) are interconnected by means of conductive wires 54 to define desired electrical conductive paths between the prongs. The system of conductive paths formed by the conductive wires 54 is determined by the arrangement desired for the components of FIG. 1B. Naturally, if desired, a component 53 can be substituted for one of the conducting wires 54. The plug 52 supports a pilot pin 56 and a key projection 58 which cooperate with the pilot hole 60 and keyway 62 of the socket to insure proper orientation of the contacts of the plug 52 with the contacts of the socket 16.

Another plurality of contacts such as are found on a twelve prong male plug 64 (FIG. 1C) commonly used in combination with a vacuum tube cooperates with the plug 12. This plug 64, when coupled to the socket 12, connects the input, output and power supply circuits to the network provided.

In FIGS. 1A, 1B, and 1C each of the plugs 52 and 64, and each of the sockets 12 and 16 were each illustrated as being of similar design. It is to be understood, however, that this was done for purposes of illustration only, and that in actual practice some precaution would be taken to prevent the accidental insertion of plug 52 into socket 12; or the insertion of plug 64 into socket 16. Obviously, one manner in which this danger can be eliminated is to provide a plug 12 and socket 64 which contains one electrical contact more than the number of contacts present in plug 52 and socket 16. Obviously, many varied and additional methods which will also be very effective in eliminating the possibility of error in connecting the wrong plugs and sockets together are also available.

Now, while this invention can be utilized to provide a family of circuits or networks utilizing resistors, capacitors, transistors, or the like—it shall, for purposes of explanation only, be illustrated with a family or group of circuit arrangements which utilize crystal diodes.

Figure 2:
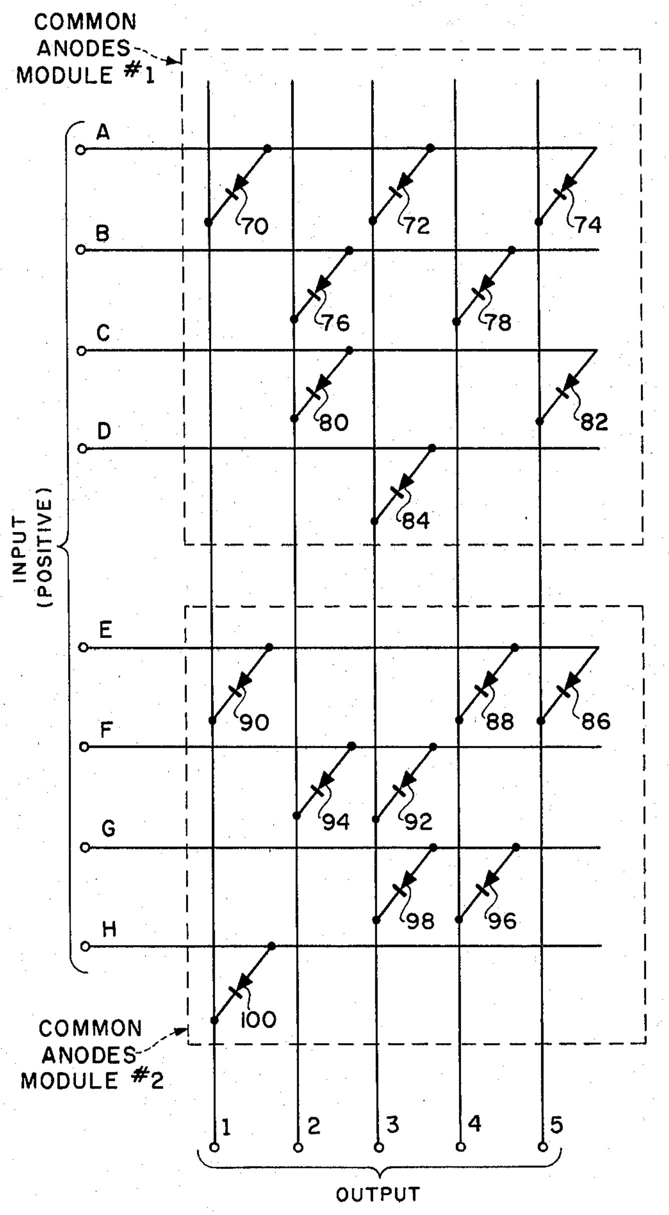
FIG. 2 illustrates one of a multitude of circuit arrangements which can be provided with structure in accordance with the principles of this invention.

FIG. 2 illustrates a crystal diode matrix which is to be provided by the structure of this invention. First, an assemblage similar to that shown in FIG. 1B is prepared wherein each of the sockets 12, 16 supports twelve contacts, each of eight contacts of socket 12 being coupled to a distinct contact of socket 16 through a crystal diode; each of the remaining four contacts of socket 12 being coupled to the remaining four contacts of socket 16 through conductive wires. However, the circuit of FIG. 2 requires sixteen crystal diodes. Therefore, since each component assemblage unit supports only eight diodes, two units will be required. In addition to the unit illustrated in FIG. 1B, an electric control means similar to that of FIG. 1A is required to provide the necessary electrical paths, and a unit similar to that of FIG. 1C is required to provide the input circuits and output circuits.

Figure 3:
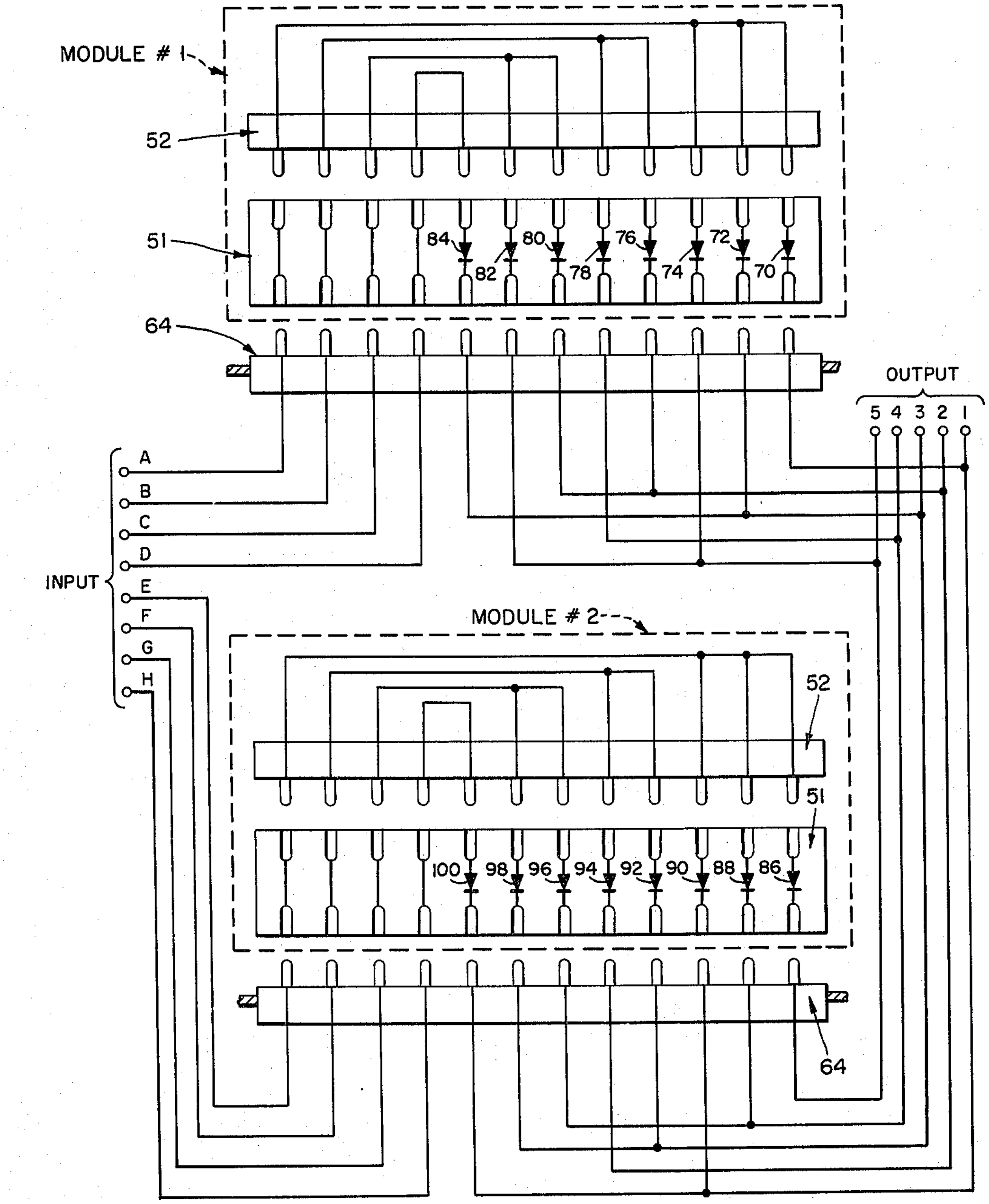
FIG. 3 illustrates structure in accordance with the principles of this invention arranged to provide the circuit arrangement of FIG. 2.

With reference to FIG. 3, there is illustrated the physical embodiment of the circuit of FIG. 2 utilizing structure in accordance with the principles of this invention. Returning to FIG. 2, a first module is utilized to provide the top eight diodes 70, 72, 74, 76, 78, 80, 82 and 84; and a second module is utilized to provide the bottom eight diodes 86, 88, 90, 92, 94, 96, 98, and 100.

In FIG. 3 it is to be noted that each of the crystal diode units is the same, and that each of the electrical control means 52 is the same. Thus, there is provided a device which not only utilizes components that are interchangeable—but there is also provided a device which permits rapid correction of physical defects by substituting component supporting units. For example, if diode 70 is not operative, that is, it is either open or shorted, then the operator merely substitutes a new electrical component unit 51 for the defective unit to correct the defect—the plugs 64 and 52 remaining the same.

Figure 4:
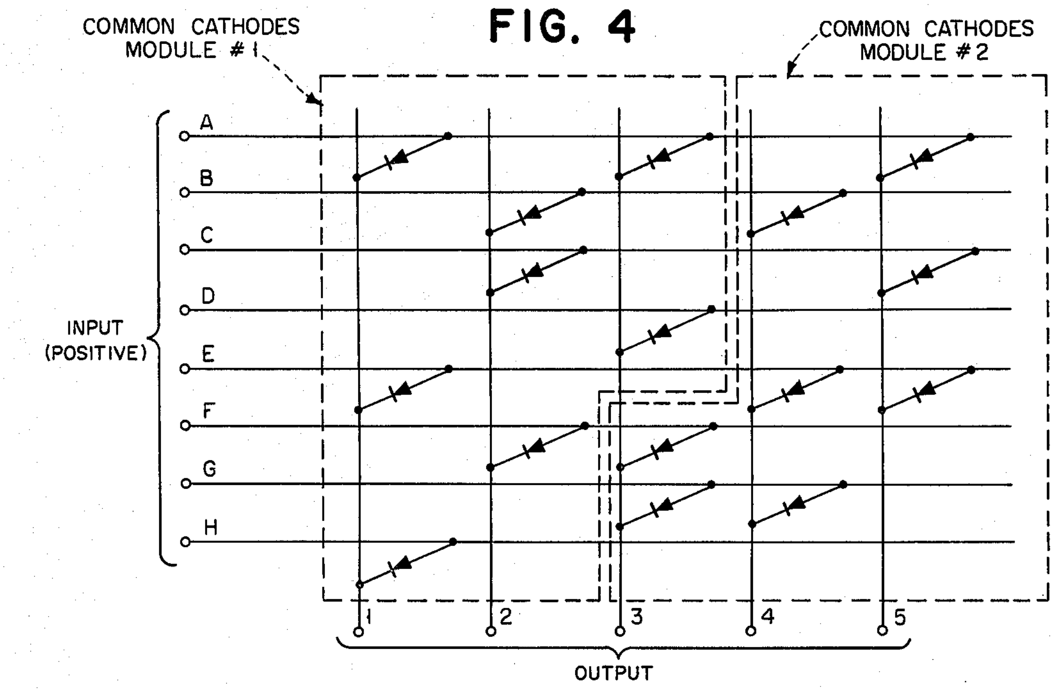
FIG. 4 illustrates another one of the multitude of circuit arrangements which can be provided with the structure of this invention.

FIG. 4 discloses another circuit which can be provided using the same diode unit as that used to provide the circuit of FIG. 2. The major difference between the circuit arrangement of FIG. 2 and that of FIG. 4 is that in FIG. 2 the anodes are in common while in FIG. 4 it is the cathodes that are in common.

Obviously, either of the circuits of FIG. 2 or FIG. 3 can be physically expanded to include many additional crystal diodes simply by providing additional electrical component units and appropriate electric control means. For example, additional diodes would be required if the matrix is to be utilized for teletype codes or the like.

Figure 5:
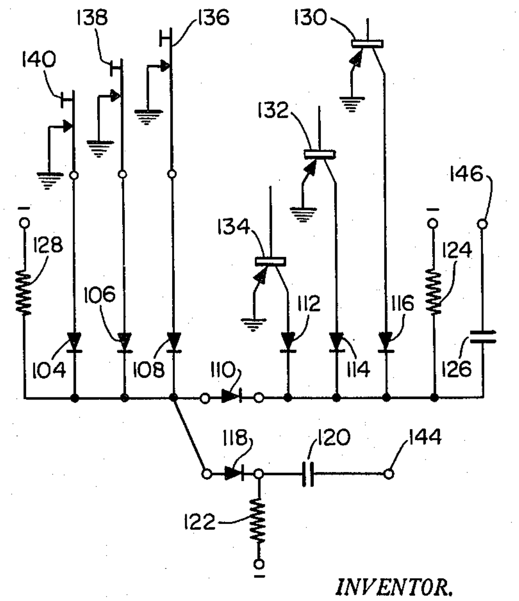
FIG. 5 illustrates still another one of the multitude of circuit arrangements which can be provided with the structure of this invention.

FIG. 5 discloses still another circuit arrangement which can be provided using the same electrical component unit of crystal diodes. In this circuit a negative pulse appears at output terminal 146 when each of the switches 136, 138, and 140, and each of the transistors 130, 132, 134 and nonconducting. Additionally, a negative pulse appears at terminal 144 when each of the switches 136, 138, and 140 are nonconducting and each of the transistors 130, 132, 134 are conducting.

Figure 6:
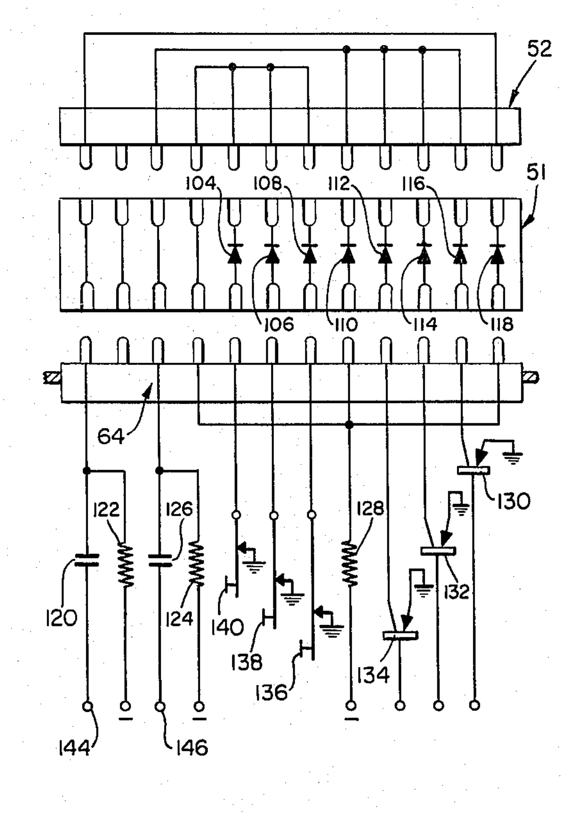
FIG. 6 illustrates structure in accordance with the principles of this invention, the structure shown being that of FIG. 3 adapted to provide the circuit arrangement of FIG. 5.

FIG. 6 illustrates the physical embodiment of the circuit of FIG. 5 using the structure of this invention. It should be noticed, however, that the plugs 64 and 52 are wired in a manner that differs from that illustrated in FIG. 3; and that the crystal diode unit has been reversed—socket 16 being coupled to plug 64, and socket 12 being coupled to plug 52. The reversal of the diode unit was necessary in order to reverse the diodes, and the changes in the wiring of the plugs 52 and 64 was required to satisfy the requirements of the external circuit.

Obviously, the electrical component unit 51 of crystal diodes utilized in providing the circuits of FIGS. 2, 4, and 5 must be capable of being turned over to provide the proper orientation for the crystal diodes. Therefore, if utmost versatility is required it is probably most desirable to provide sockets 12 and 16 which are similar in design. However, if this is not deemed desirable, then socket adapters can be provided to permit the use of different sockets 12, 16 and still provide a unit 51 which can be turned over.

Thus, it has been illustrated how an electrical component unit 51 can be utilized to provide a desired one of a group or family of network arrangements. It should be remembered, however, that the components 28, 34, 40 of the unit 51 (FIG. 1B) are not restricted to crystal diodes; that they can be resistors, transistors, capacitors, inductors or the like, and that the circuits of FIGS. 2, 4 and 5 were here presented for illustrative purposes only, and that this invention is not restricted to these illustrations.

Obviously many modifications and variations of the present invention are possible in the light of the above teachings. It is therefore to be understood that within the scope of the appended claims the invention may be practiced otherwise than as specifically described.

What is claimed is:

1. A network assemblage, comprising in combination:

a tubular body made of insulative material, open at opposite ends and having a lateral opening therein;

a first socket rotatably disposed at one end of said body, said first socket having first socket openings, first contacts in said socket openings, first contact extensions extending into said body axially thereof;

a second socket rotatably disposed at the other end of said body, said second socket having second socket openings, second contacts in said second socket openings, second contact extensions extending into said body axially thereof, whereby the first and second sockets can be rotated relative to each other on said tube to align the first contact extensions with the second contact extensions in the tube;

means detachably engaged with both sockets for fixing the same in a position where the first and second contact extensions are aligned with each other in the tube;

circuit components in the tube, each circuit component being respectively connected between a different one of the first contact extensions and a different one of the second contact extensions aligned with said one of the first contact extensions, whereby the several circuit components are connected in a plurality of electrically independent internal circuits including the first and second contacts in a cylindrical array, and whereby rotation of said sockets together with respect to said tube exposes any one of said circuit components in said cylindrical array at said lateral opening in said body;

a first plug for connection to a first external circuit, said plug having prongs removably insertable into openings in either one of the sockets for connection of said external circuit thereto; and a second plug for a second external circuit, said second plug having other prongs removably insertable into openings in the remaining one of the sockets, whereby certain of said components are selectively connected in circuit with certain prongs of both plugs, so that either external circuit can be quickly and detachably connected to certain contacts of either socket while the other external circuit is quickly and detachably connected to certain other contacts of the other socket for selectively connecting certain of said components in both external circuits.

2. A network assemblage, comprising in combination:

a tubular body made of insulative material, open at opposite ends;

a first socket rotatably disposed at one end of said body, said first socket having first socket openings, first contacts in said socket openings, first contact extensions extending into said body axially thereof;

a second socket rotatably disposed at the other end of said body, said second socket having second socket openings, second contacts in said second socket openings, second contact extensions extending into said body axially thereof, whereby the first and second sockets can be rotated relative to each other on said tube to align the first contact extensions with the second contact extensions in the tube;

means detachably engaged with both sockets for fixing the same in a position where the first and second contact extensions are aligned with each other in the tube;

circuit components in the tube, at least some of said components being unidirectional conducting electrical rectifier elements, each of said circuit components being respectively connected between a different one of the first contact extensions and a different one of the second contact extensions aligned with said one of the first contact extensions, whereby the several circuit components are connected in a plurality of electrically independent internal circuits including the first and second contacts in a cylindrical array;

a first plug for connection to a first external circuit, said plug having prongs removably insertable into openings in either one of the sockets for connection of said external circuit thereto; and a second plug for a second external circuit, said second plug having other prongs removably insertable into openings in the remaining one of the sockets, whereby certain of said components are selectively connected in circuit with certain prongs of both plugs, so that either external circuit can be quickly and detachably connected to certain contacts of either socket while the other external circuit is quickly and detachably connected to certain other contacts of the other socket for selectively connecting certain of said components in both external circuits;

and so that interchanging the connections of the plugs to the respective sockets reverses electrical conducting directions of the internal circuits containing rectifier elements with respect to the external circuits.

References Cited by the Examiner

UNITED STATES PATENTS

| | | | |
|---|---|---|---|
| 2,892,131 | 6/1959 | MacDonnell | 29—155.5 |
| 2,913,633 | 11/1959 | Iannelli | 317—101 |
| 3,109,124 | 10/1963 | Sinninger | 174—52 |

KATHLEEN H. CLAFFY, *Primary Examiner.*

JOHN F. BURNS, *Examiner.*